US012754558B2

(12) United States Patent
Deng et al.

(10) Patent No.: US 12,754,558 B2
(45) Date of Patent: Oct. 6, 2026

(54) CHARACTERISTIC ESTIMATION OF A VEHICLE USING SLOPES FROM IMAGES

(71) Applicant: Toyota Motor Engineering & Manufacturing North America, Inc., Plano, TX (US)

(72) Inventors: Xintong Deng, Ann Arbor, MI (US); Yufei Zhu, Ypsilanti, MI (US); Taro Tsukada, Nagaizumi (JP)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/649,320

(22) Filed: Apr. 29, 2024

(65) Prior Publication Data

US 2025/0334971 A1 Oct. 30, 2025

(51) Int. Cl.

| | |
|---|---|
| ***G05D 1/49*** | (2024.01) |
| ***G05D 109/20*** | (2024.01) |
| ***G05D 111/10*** | (2024.01) |
| ***G06V 20/17*** | (2022.01) |

(52) U.S. Cl.

CPC ............... *G05D 1/49* (2024.01); *G06V 20/17* (2022.01); *G05D 2109/20* (2024.01); *G05D 2111/14* (2024.01)

(58) Field of Classification Search

CPC ........................................................ G05D 1/49

See application file for complete search history.

(56) References Cited

U.S. PATENT DOCUMENTS

| | | | | |
|---|---|---|---|---|
| 6,181,989 | B1 | 1/2001 | Gwozdecki | |
| 2006/0085130 | A1 | 4/2006 | Belenkii et al. | |
| 2007/0129853 | A1 | 6/2007 | Greenfeld et al. | |
| 2015/0145704 | A1 | 5/2015 | Dahan | |
| 2017/0078552 | A1* | 3/2017 | Pochon | H04N 23/698 |
| 2019/0155314 | A1 | 5/2019 | DeBitetto et al. | |
| 2019/0359300 | A1* | 11/2019 | Johnson | G01S 13/867 |
| 2019/0361457 | A1* | 11/2019 | Johnson | G05D 1/0206 |
| 2022/0081107 | A1 | 3/2022 | Merdinger | |
| 2022/0083061 | A1 | 3/2022 | Xie et al. | |
| 2022/0146263 | A1* | 5/2022 | Michini | G01C 21/20 |

(Continued)

FOREIGN PATENT DOCUMENTS

| | | | |
|---|---|---|---|
| CN | 110209202 | A | 9/2019 |
| CN | 111307291 | A | 6/2020 |
| CN | 116519146 | A | 8/2023 |

(Continued)

OTHER PUBLICATIONS

Google Machine translation of NPL, KR-102254491-B1 (Year: 2021).*

(Continued)

*Primary Examiner* — Jean Paul Cass

(74) *Attorney, Agent, or Firm* — Jordan IP Law, LLC

(57) ABSTRACT

A computing system may include a processor. The computing system may include a memory having a set of instructions, which when executed by the processor, cause the computing system to obtain, from an imaging sensor, an image, determine isothermal lines on portions of the image that represent the sky, and determine a characteristic of a vehicle based on slopes of the isothermal lines.

17 Claims, 13 Drawing Sheets

(56) References Cited

U.S. PATENT DOCUMENTS

| | | | | |
|---|---|---|---|---|
| 2024/0319746 A1* | 9/2024 | Johnson | .................. | G01S 15/89 |
| 2025/0042545 A1* | 2/2025 | Heafitz | ................... | G06T 7/174 |

FOREIGN PATENT DOCUMENTS

| | | | | |
|---|---|---|---|---|
| KR | 102254491 B1 * | 5/2021 | ............. | H04N 7/185 |
| WO | 2017055818 A2 | 4/2017 | | |

OTHER PUBLICATIONS

Taylor et al., "Horizon Sensing Attitude Stabilisation: A VMC Autopilot," Presented to the 18th International UAV Systems Conference, Bristol, UK, 2003.

* cited by examiner

CHARACTERISTIC ESTIMATION OF A VEHICLE USING SLOPES FROM IMAGES

TECHNICAL FIELD

Examples generally relate to determining a characteristic of a vehicle based on imaging data from an imaging sensor of the vehicle. In detail, examples determine isothermal lines based on portions of the image that represent the sky and determine a characteristic of the vehicle based on slopes of the isothermal lines.

BACKGROUND

Recently, there has been a significant increase in the use of machines (e.g., vehicles and/or drones, etc.) to carry out different tasks in various settings. For example, unmanned aerial vehicles (e.g., drones) may perform functions including photography, filming, delivering goods, transporting humans, etc. Some robots and/or vehicles may be used in manufacturing centers, warehouses, restaurants, etc. Airborne wind-energy may include unpowered aircrafts, such as kites, that are controlled to generate electricity. In such scenarios, machines may seek to safely navigate in a dynamic and changing environment.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some aspects, the techniques described herein relate to a control system including a processor, and a memory having a set of instructions, which when executed by the processor, cause the control system to obtain, from an imaging sensor, an image, determine isothermal lines on portions of the image that represent the sky, and determine a characteristic of a vehicle based on slopes of the isothermal lines.

In some aspects, the techniques described herein relate to at least one computer readable storage medium including a set of instructions, which when executed by a computing device, cause the computing device to obtain, from an imaging sensor, an image, determine isothermal lines on portions of the image that represent the sky, and determine a characteristic of a vehicle based on slopes of the isothermal lines.

In some aspects, the techniques described herein relate to a machine including an imaging sensor that obtains an image, a processor; and a memory having a set of instructions, which when executed by the processor, cause the machine to determine isothermal lines on portions of the image that represent the sky, and determine a characteristic of a vehicle based on slopes of the isothermal lines.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1A:
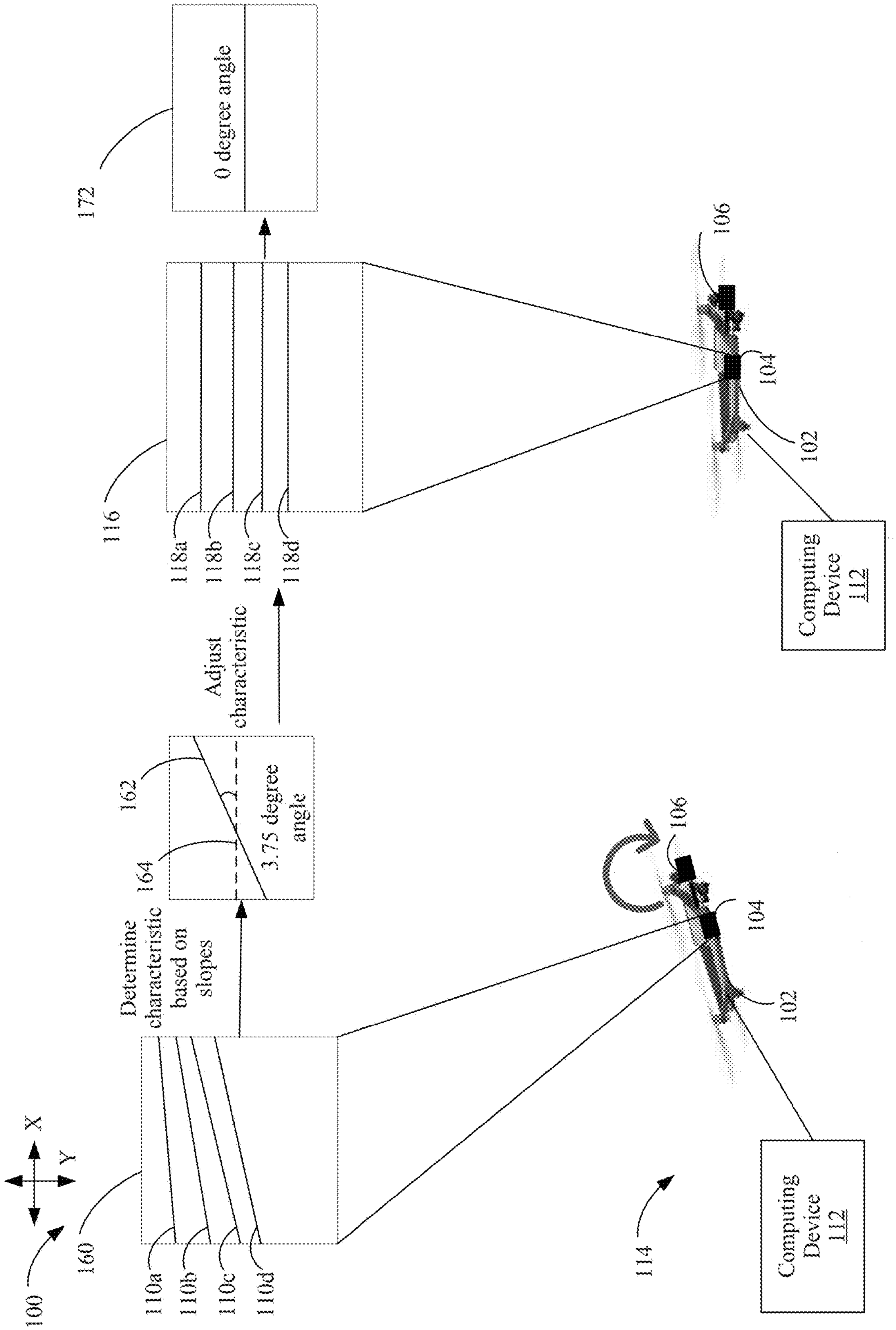
FIGS. 1A and 1B are diagrams of a characteristic identification and machine adjustment process.

Navigation and operational processes of a machine (e.g., vehicles, robots, drones, etc.) may include determining a characteristic (e.g., attitude) of the machine. For example, orienting an aircraft within certain boundaries may enhance the operational efficiency and control of the aircraft, and further reduce risks of the aircraft. That is, control of the aircraft may be maintained based on the attitude of the aircraft. For example, suppose that the attitude of the aircraft is incorrectly estimated, the operational efficiency of the aircraft may be reduced and/or the aircraft may be placed into a dangerous situation (e.g., potentially crash). Other vehicles (e.g., construction equipment, automobiles, trucks, other motor vehicles, etc.) and/or robots (e.g., underwater drone and/or other types of drones) may also execute operations based on similar such characteristics to properly orient and navigate.

Existing technology may access a red, green and blue (RGB) camera to identify a visual marker (e.g., horizon), or access another odometry method to estimate characteristics of the vehicle, such as attitude, orientation and/or position. Using RGB cameras results in poor performance in low light environments (e.g., nighttime) and may lead to inaccurate estimations of characteristics such as pitch, roll, and/or position.

Other existing technology may include inertial measurement units (IMUs). An IMU may be composed of several accelerometers, gyroscopes, and/or magnetometers. The IMU may estimate and report specific dynamic states such as angular velocity and accelerations, which may be used to determine attitude angles (roll and/or pitch), or velocity and position increments. IMUs may be prone to failure, particularly due to electromagnetic interference and therefore are unreliable under certain conditions. Further, erroneous IMU data may be observed after impacts to the vehicle. Moreover, IMUs may drift after prolonged flight time resulting in inaccurate data.

Therefore, existing technology provides several problems, including failing to provide a reliable process to consistently ascertain characteristics of a vehicle, and particularly the attitude of the vehicle. Thus, existing technology may be considered unreliable in terms of determining the characteristics of the vehicle, including pitch and roll.

Examples herein enhance the existing technology by incorporating a vision-based process and solution that produces accurate results in various lighting conditions, including low levels of illumination (e.g., nighttime) and high levels of illumination (e.g., daytime). The enhanced process described herein may operate in any level of illumination. To do so, examples obtain, from an imaging sensor (IR imaging sensor), an image, determine isothermal lines on portions of the image (e.g., IR image) that represents the sky, and determine a characteristic of a vehicle based on slopes of the isothermal lines. Each of the isothermal lines may be placed over areas with a particular temperature to illustrate the positioning of the temperature on the image, and the slopes of the isothermal lines may indicate the attitude (e.g., the pitch and roll) of the vehicle.

IR imaging may be incorporated into the enhanced examples and solutions for several reasons. For example, IR imaging may be effective and accurate during daytime and nighttime. Furthermore, IR imaging is cost effective. IR imaging sensors may capture IR radiation (e.g., a form of electromagnetic radiation) that has wavelengths ranging from 760 nanometers (nm) to 100,000 nm. Examples may be incorporated in various machines (e.g., vehicles, robots, airplanes, satellites, water, air drones, water drones, etc.) to facilitate navigation, steering, etc.

Figure 1B:
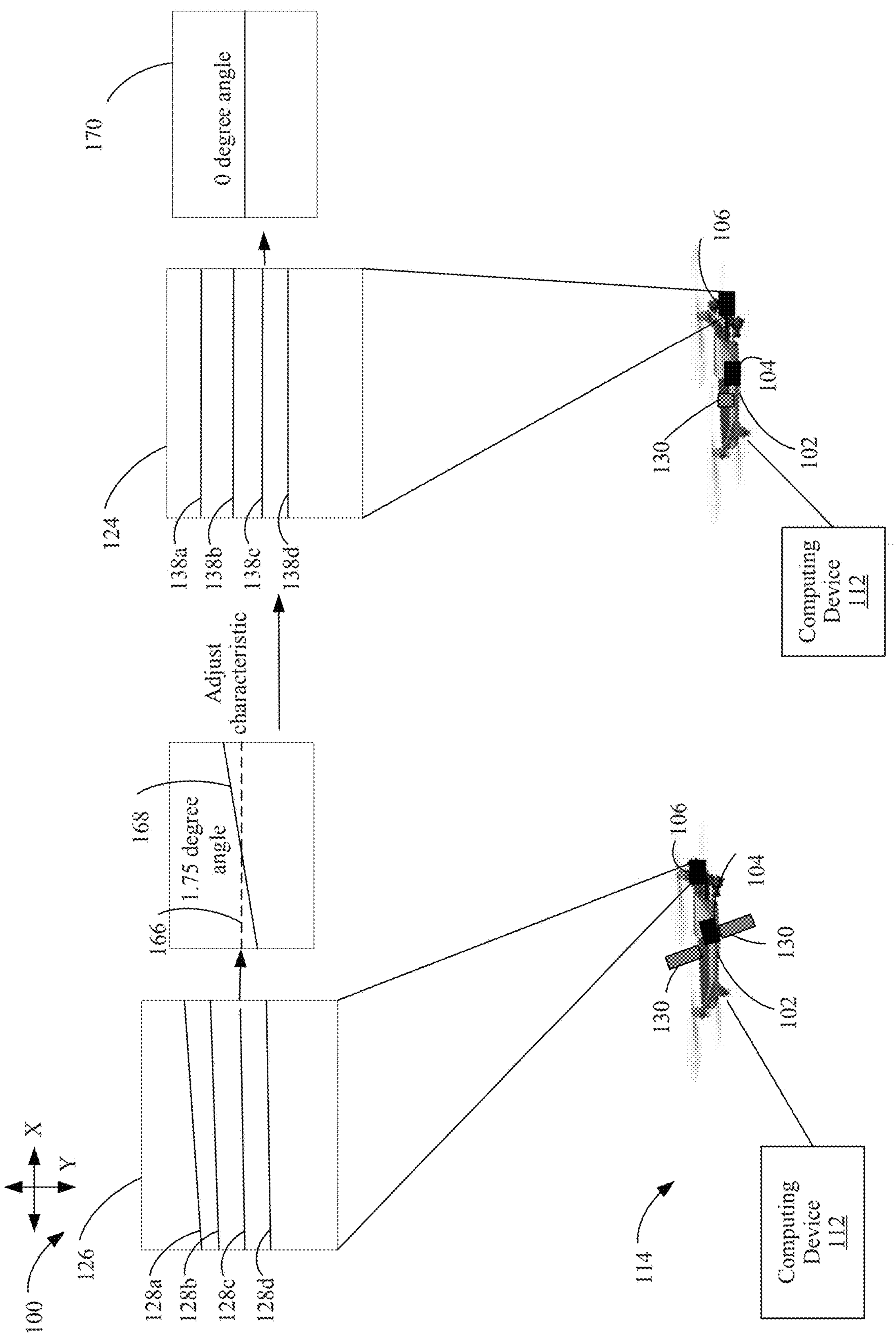

Turning now to FIGS. 1A-1B, a characteristic identification and machine adjustment process 100 is illustrated. In this example, the machine is an autonomous drone 102, but it will be understood that other machines, such as aircrafts, robots, and vehicles may be readily substituted for the autonomous drone 102. The autonomous drone 102 includes a first imaging sensor 104 and a second imaging sensor 106. That is, the autonomous drone 102 may include a two-imaging sensor system (e.g., cameras). The first imaging sensor 104 and the second imaging sensor 106 may be mounted on the pitch axis and roll axis of the autonomous drone 102, respectively. Estimated angles from the first imaging sensor 104 and second imaging sensor 106 may be translated to pitch and roll angle directly.

The autonomous drone 102 and/or computing device 112 may include a system estimating the orientation of the autonomous drone 102 (e.g., an unmanned aircraft) by processing image data from first imaging sensor 104 and the second imaging sensor 106 (e.g., two infrared (IR) cameras) that are perpendicularly-oriented relative to each other to obtain images that are oriented perpendicular to each other. The first imaging sensor 104 and second imaging sensor 106 are outward-facing and captures images that at least partially represent the sky. In particular, the autonomous drone 102 has the second imaging sensor 106 (e.g., IR camera) facing in a forward direction, and the first imaging sensor 104 (e.g., IR camera) facing left or right (e.g., perpendicular to the forward direction). For example, the second imaging sensor 106 determines the roll of the aircraft while the first imaging sensor 104 determines the pitch.

The first and second imaging sensors 104, 106 may connect with a computing device 112 (e.g., wired, and/or wireless signals such as Bluetooth, radio, etc.) that controls some actions of the autonomous drone 102. In some examples, the computing device 112 may be omitted, and instead the autonomous drone 102 includes hardware (e.g., microcontroller) that enables the autonomous drone 102 to operate autonomously (e.g., an edge drone). The autonomous drone 102 and the computing device 112 may be referred to as a machine system 114. In some examples, the machine system 114 may include only the autonomous drone 102 and omit the computing device 112 when the autonomous drone 102 is an edge drone. Depending on the implementation, the computing device 112 and/or the autonomous drone 102 may include a control system that comprises a processor, and a memory having a set of instructions, which when executed by the processor, cause the control system to implement aspects as described herein.

The machine system 114 implements a vision-based algorithm to identify characteristics (e.g., position, roll, pitch, yaw, orientation, etc.) of the autonomous drone 102. The first and second imaging sensors 104, 106 may accurately accommodate various illumination levels, including low-light condition during night operation.

In this example, the first imaging sensor 104 is an infrared sensor and has a side-facing posture on the autonomous drone 102. The first imaging sensor 104 obtains IR images of a side area of the autonomous drone 102. The side area may at least partially represent the sky (e.g., the sky is shown in the images). To determine the characteristics of the autonomous drone 102, a first image 160 (e.g., an IR image) captured by the first imaging sensor 104 is analyzed. The first image 160 may capture and represent IR conditions in the sky. The computing device 112 may receive the first image 160 and analyze the first image 160 as described below.

IR levels may increase with increasing temperature. That is, IR levels correspond to temperature. Therefore, the computing device 112 may determine temperatures represented in the first image 160 based on IR levels that are present in the first image 160. For example, portions of the first image 160 with greater levels of IR (e.g., greater IR intensity) correspond to higher temperatures, while portions of the first image 160 with lower levels of IR (e.g., lower IR intensity) correspond to lower temperatures.

The computing device 112 may then mask different temperature ranges and/or temperatures. For example, the computing device 112 may generate first-fourth isothermal lines **110*a*-110*e*** (e.g., boundaries) between different temperature ranges that are identified.

For example, first isothermal line **110*a* may be mapped to portions of the first image 160 that only have a temperature of 240 Kelvin (K). That is, parts of the first image 160 that have a first amount (e.g., intensity) of IR are marked with the first isothermal line 110*a*. Thus, the first isothermal line 110*a* may illustrate only the positions of the first image 160 that have a temperature of 240 K. Therefore, the temperature range in an area above the first isothermal line 110*a* may be less than 240 K. In some examples, the first isothermal line 110*a*** may mark a range of temperatures (e.g., 240 K-245 K).

The second isothermal line **110*b* may be mapped to portions of the first image 160 that only have a temperature of 250 K. That is, parts of the first image 160 that have a second amount (e.g., intensity) of IR are marked with the second isothermal line 110*b*. Thus, the second isothermal line 110*b* may illustrate only the positions of the second imaging sensor 106 that have a temperature of 250 K. Therefore, the temperature range in an area outside the first isothermal line 110*a* and up to the second isothermal line 110*b* may be 241 K-249 K. In some examples, the second isothermal line 110*b*** may mark a range of temperatures (e.g., 250 K-255 K).

The third isothermal line **110*c* may be mapped to portions of the first image 160 that only have a temperature of 260 K. That is, parts of the first image 160 that have a third amount of IR (e.g., intensity) are marked with the third isothermal line 110*c*. Thus, the third isothermal line 110*c* may illustrate only the positions of the first image 160 that have a temperature of 260 K. The temperature range in an area outside the second isothermal line 110$b$ and up to the third isothermal line 110$c$ may be 251 K-259 K. In some examples, the third isothermal line 110**$c$ may mark a range of temperatures (e.g., 260 K-265 K).

The fourth isothermal line 110$d$ may be mapped to portions of the first image 160 that only have a temperature of 270 K. That is, parts of the first image 160 that have a fourth amount of IR (e.g., intensity) are marked with the fourth isothermal line 110$d$. Thus, the fourth isothermal line 110$d$ may illustrate only the positions of the first image 160 that have a temperature of 270 K. The temperature range in an area outside the third isothermal line 110$c$ and up to the fourth isothermal line 110$d$ may be 261 K-269 K. In some examples, the fourth isothermal line 110$d$ may mark a range of temperatures (e.g., 270 K-275 K).

The computing device 112 may filter temperature-altering objects with exclusion masks to exclude particular objects from the analysis of the first image 160, and in the above analysis to generate the first isothermal line 110$a$-fourth isothermal line 110$d$. For example, the sun may skew results (e.g., produce an unusually high IR) and is therefore masked. Similarly, other objects (e.g., birds, other aircrafts, skydivers, clouds, etc.) that alter the sky temperatures and/or alter IR are masked in second imaging sensor 106 and are not considered during the generation of the first-fourth isothermal lines 110$a$-110$d$. The temperature-altering objects will be masked out (e.g., an image mask will be created to remove) from the image. That is, features which are overlaid on the sky (e.g., not part of the sky) in the first image 160 and produce IR may be removed. The temperature-altering objects will be masked out (e.g., an image mask will be created to remove the temperature-altering object) from the image.

The computing device 112 may generate a characteristic based on slopes of first isothermal line 110$a$-fourth isothermal line 110$d$. Slopes of the first isothermal line 110$a$-fourth isothermal line 110$d$ with respect to the horizon may be calculated. The slopes may be averaged together to generate an average slope. The average slope corresponds to the pitch of the autonomous drone 102. For example, the inverse tangent of the average slope is the pitch. In this example, the inverse tangent of the average slope is 3.75, meaning that the angle between the horizon 164 and a reference line 162 that has the average slope is 3.75. The reference line 162 may correspond to the longitudinal axis of the autonomous drone 102.

Therefore, the computing device 112 may determine the characteristics of the autonomous drone 102. The computing device 112 may determine that the autonomous drone 102 has a pitch that is a positive value. Meaning that the autonomous drone 102 is angled upward so that movement of the autonomous drone 102 is at least partially backward.

Based on the determined characteristic (e.g., the pitch), the computing device 112 may adjust the autonomous drone 102 so that the pitch approaches zero as shown in the adjusted angle image 172 and the autonomous drone 102 adopts a level flight pattern. The autonomous drone 102 may obtain a second image 116. The computing device 112 may generate first-fourth isothermal lines 118$a$-118$d$ similar to as described above with respect to the first-fourth isothermal lines 110$a$-110$d$. The first-fourth isothermal lines 110$a$-110$d$ may respectively correspond to first-fourth isothermal lines 118$a$-118$d$. The first-fourth isothermal lines 110$a$-110$d$ may be angled differently relative to the first-fourth isothermal lines 118$a$-118$d$. Thus, the slopes of the first-fourth isothermal lines 118$a$-118$d$ with respect to the horizon are different from the first-fourth isothermal lines 110$a$-110$d$. That is, the slope of the first isothermal line 110$a$ is different from the slope of the first isothermal line 118$a$. The slope of the second isothermal line 110$b$ is different from the slope of the second isothermal line 118$b$. The slope of the third isothermal line 110$c$ is different from the slope of the third isothermal line 110$c$. The slope of the fourth isothermal line 110$d$ is different from the slope of the fourth isothermal line 110$d$.

The slopes of the first-fourth isothermal lines 118$a$-118$d$ may be averaged together to determine an average slope of 0 for the first-fourth isothermal lines 118$a$-118$d$. Therefore, the average slope is a zero degree angle as shown in positional diagram 170, meaning that the pitch is 0. Thus, the computing device 112 may determine slopes (e.g., gradients) of the first-fourth isothermal lines 110$a$-110$d$ and the first-fourth isothermal lines 118$a$-118$d$.

Turning now to FIG. 1B, concurrently with the pitch determination described above or at separately therefrom, a roll of the autonomous drone 102 may be determined. In this example, the second imaging sensor 106 has the forward-facing posture on the autonomous drone 102. The second imaging sensor 106 obtains IR images of a forward area of the autonomous drone 102. The forward area may at least partially represent the sky (e.g., the sky is shown in the images). To determine the roll of the autonomous drone 102, a third image 126 captured by the second imaging sensor 106 is analyzed. The second imaging sensor 106 may capture and represent IR conditions in the sky in front of the autonomous drone 102. The computing device 112 may receive the third image 126 and analyze the third image 126 as indicated below.

Similar to above, the computing device 112 may determine temperatures represented in the third image 126 based on IR levels that are present in the third image 126. For example, portions of the third image 126 with greater levels of IR (e.g., greater IR intensity) correspond to higher temperatures, while portions of the third image 126 with lower levels of IR (e.g., lower IR intensity) correspond to lower temperatures.

The computing device 112 may then mask different temperature ranges and/or temperatures. For example, the computing device 112 may generate first-fourth isothermal lines 128$a$-128$d$. The first-fourth isothermal lines 128$a$-128$d$ may be (e.g., boundaries) between different temperature ranges that are identified, and correspond to first-fourth isothermal lines 110$a$-110$d$. For example, first isothermal line 128$a$ may be mapped to portions of the third image 126 that only have a temperature of 240 K. The second isothermal line 128$a$ may be mapped to portions of the third image 126 that only have a temperature of 250 K. The third isothermal line 128$c$ may be mapped to portions of the third image 126 that only have a temperature of 260 K. The fourth isothermal line 128$d$ may be mapped to portions of the third image 126 that only have a temperature of 270 K. In some examples, the first-fourth isothermal lines 128$a$-128$d$ may each be mapped to a range of temperatures. Similar to above, the computing device 112 may filter temperature-altering objects with exclusion masks to exclude particular objects from the analysis of the third image 126 to generate the first-fourth isothermal lines 128$a$-128$d$.

The computing device 112 may determine the roll based on slopes of first-fourth isothermal lines 128$a$-128$d$. Slopes of the first-fourth isothermal lines 128$a$-128$d$ with respect to the horizon may be calculated. The slopes may be averaged together to generate an average slope. The average slope corresponds to the roll of the autonomous drone 102. For example, the inverse tangent of the average slope is the roll.

In this example, the inverse tangent of the average slope is 1.75, meaning that the angle between the horizon 166 and a reference line 168 that has the average slope is 1.75. The reference line 168 may correspond to an axis extending along the wings 130 (e.g., wing-to-wing direction) of the autonomous drone 102.

Therefore, the computing device 112 may determine the characteristics of the autonomous drone 102. The computing device 112 may determine that the autonomous drone 102 has a roll that is a positive value. Meaning that motion of the autonomous drone 102 is angled and not straight so that movement of the autonomous drone 102 is at least partially to along a side-to-side direction.

Based on the determined characteristic (e.g., the roll), the computing device 112 may adjust the autonomous drone 102 so that the roll approaches zero and the autonomous drone 102 adopts a straight flight pattern. The autonomous drone 102 may obtain a fourth image 124. The computing device 112 may generate first-fourth isothermal lines 138*a*-138*d* similar to as described above with respect to the first-fourth isothermal lines 110*a*-110*d* and the first-fourth isothermal lines 128*a*-128*d*. The first-fourth isothermal lines 128*a*-128*d* may respectively correspond to first-fourth isothermal lines 138*a*-138*d*. The first-fourth isothermal lines 138*a*-138*d* may be angled differently relative to the first-fourth isothermal lines 128*a*-128*d*. Thus, the slopes of the first-fourth isothermal lines 138*a*-138*d* are different from the first-fourth isothermal lines 128*a*-128*d*. That is, the slope of the first isothermal line 128*a* is different from the slope of the first isothermal line 138*a*. The slope of the second isothermal line 128*b* is different from the slope of the second isothermal line 138*b*. The slope of the third isothermal line 128*c* is different from the slope of the third isothermal line 138*c*. The slope of the fourth isothermal line 128*d* is different from the slope of the fourth isothermal line 128*d*.

The slopes of the first-fourth isothermal lines 138*a*-138*d* may be averaged together to determine an average slope of 0 for the first-fourth isothermal lines 138*a*-138*d*. Therefore, the average slope is a 0-degree angle as shown in roll diagram 170, meaning that the roll is zero. Thus, the computing device 112 may determine slopes (e.g., gradients) of the first-fourth isothermal lines 128*a*-128*d* and the first-fourth isothermal lines 138*a*-138*d* to adjust the roll.

Figure 1C:
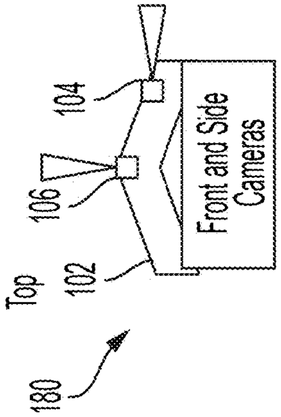
FIGS. 1C and 1D illustrate different views of an autonomous drone and sensors.
Figure 1D:
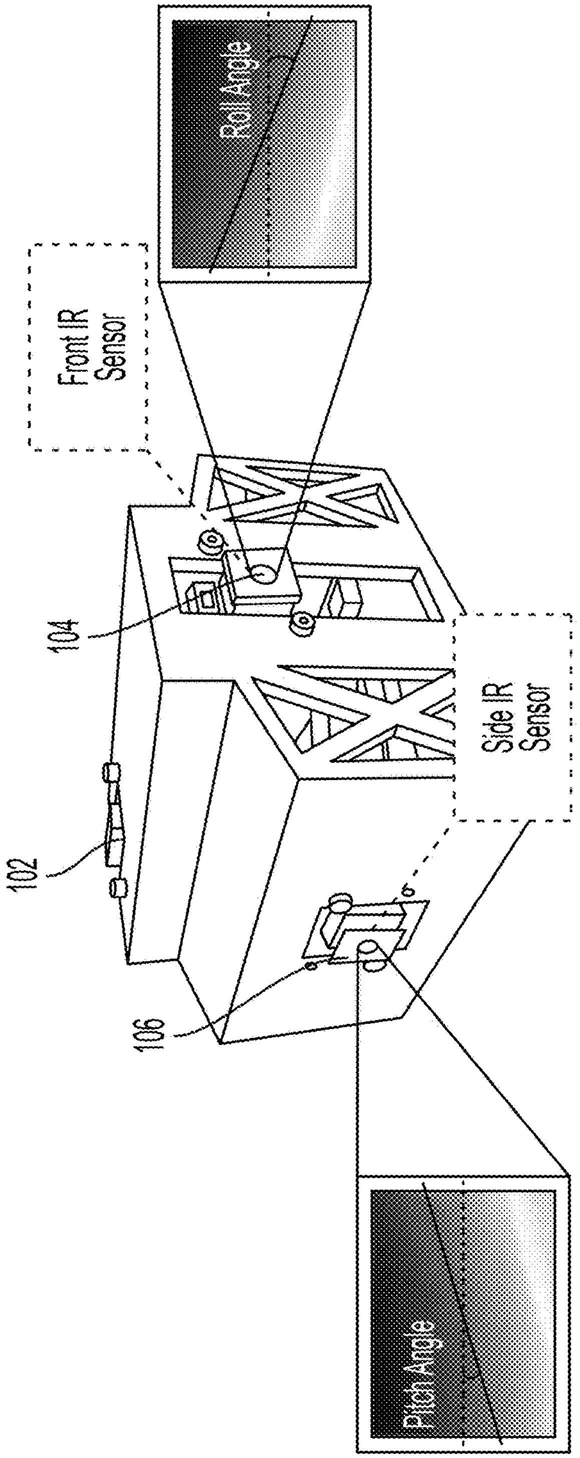

FIG. 1C illustrates a close-up perspective 180 of the autonomous drone 102, second imaging sensor 106 and the first imaging sensor 104. In the close-up perspective 180, it is clear that the second imaging sensor 106 and first imaging sensor 104 are disposed to have unobstructed views of the sky in forward and side areas.

In some examples, the machine system 114 further includes an IMU that generates IMU data. The computing device 112 may analyze the IMU data (as described above) in addition to the IR data generated by the first imaging sensor 104. In such examples, the machine system 114 implements a sensor fusion algorithm that incorporates an estimated attitude (e.g., angles) generated based on the IR data, and the IMU angle (e.g., attitude such as angle) to provide a better estimation. For example, The IMU data and the estimated attitude from the IR sensor will be fed into some sensor fusion method such as extended Kalman filter or complementary filter, or other data driven methods. The autonomous drone 102 may remain in a stable flight with the estimated angle from IR data.

It should be noted that some of the features described herein may be implemented in software, hardware and/or a combination of software and hardware. In some examples, the computing device computing device 112 and/or autonomous drone 102 includes at least one computer readable storage medium comprising a set of instructions, which when executed by the computing device 112 and/or autonomous drone 102, cause the computing device 112 and/or autonomous drone 102 to implement the above described features.

Figure 2:
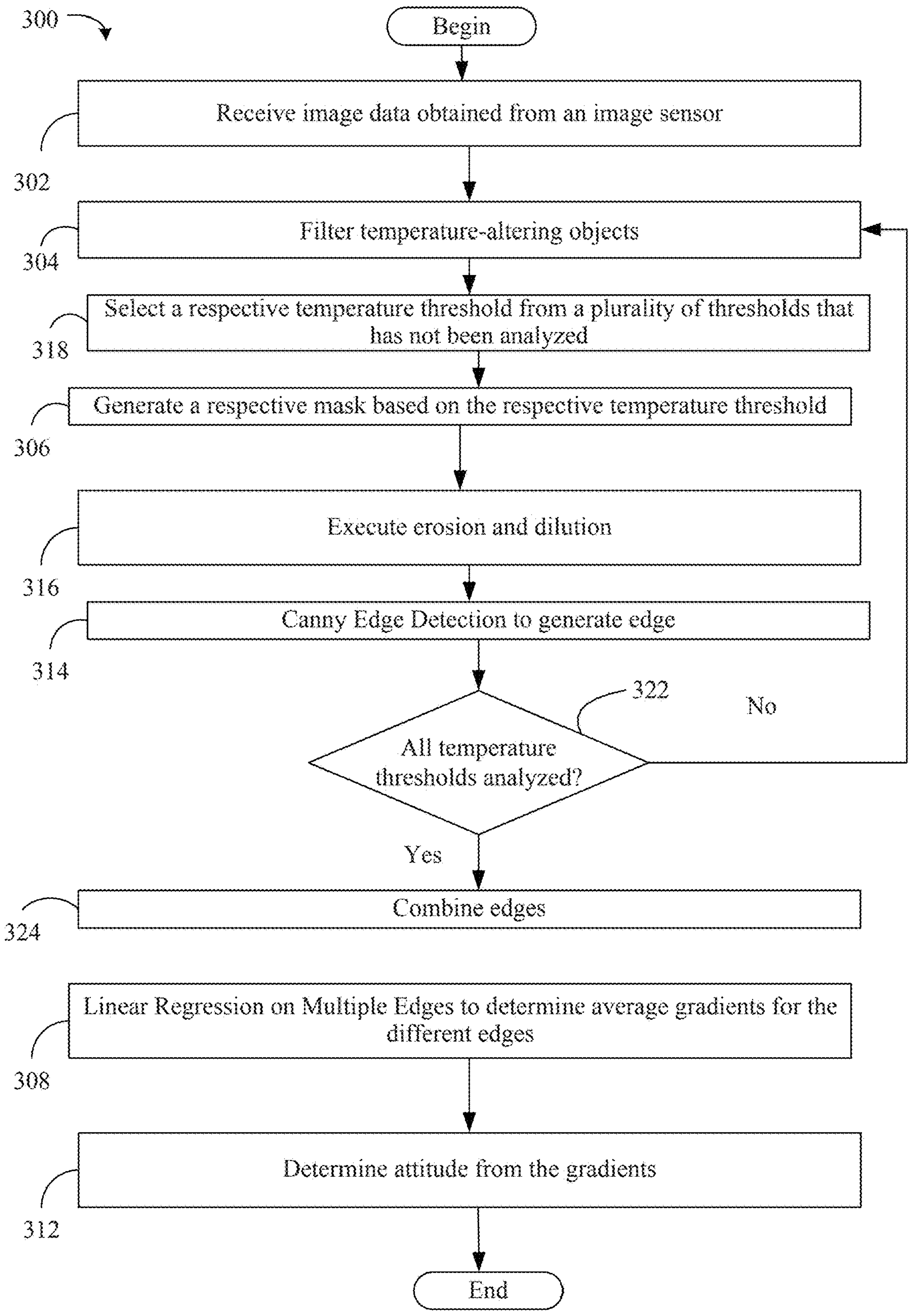
FIG. 2 shows a method of characteristic identification based on infrared data.

FIG. 2 shows a method 300 of characteristic identification based on IR data. The method 300 may generally be implemented as part of the characteristic identification and machine adjustment process 100 (FIGS. 1A-1D). In an embodiment, the method 300 is implemented in logic instructions (e.g., software), a non-transitory computer readable storage medium, circuitry, configurable logic, fixed-functionality hardware logic, etc., or any combination thereof.

Illustrated processing block 302 receives image data of an IR image obtained from an image sensor. The image sensor is an IR camera in some examples. Illustrated processing block 304 filters temperature-altering objects (e.g., sun, clouds, aircraft, etc.) from the image data that may affect temperature analysis.

Illustrated processing block 318 selects a respective temperature threshold from a plurality of thresholds that has not been analyzed in illustrated processing blocks 304, 318, 306, 316, 314, 318, 322. That is, each temperature threshold may be individually analyzed and processed. Thus, illustrated processing blocks 304, 318, 306, 316, 314, 322 form an iterative process in which the IR image of the image data is processed multiple times based on different temperature thresholds. The outputs of the iterative process may be combined.

Illustrated processing block 306 generates a respective mask based on the respective temperature threshold. For example, during the iterative process, the IR image may go through multiple temperature thresholding and mask generation iterations based on the different temperature thresholds. In each iteration, the IR image (that is masked to remove the temperature-altering objects) is converted to a binary image based on the respective temperature threshold to mask (e.g., where the IR image is above and below the respective temperature threshold) the IR image. Portions of the IR image below the respective temperature threshold are marked with a binary value (e.g., "1") and portions of the IR image above and equal to the respective temperature threshold are marked with the other binary value (e.g., "0") to generate a masked binary image.

Processing block 306 is followed by illustrated processing block 316 which includes executing an erosion followed by dilution to remove potential openings and smooth out edges of the respective mask of the masked binary image.

Illustrated processing block 314 applies canny edge detection to the masked binary image to generate an edge that is a border between the areas having values above and below the respective temperature threshold. The edge is an isothermal line. The outcome is the masked binary image with only the isothermal line (e.g., edge) marked with a first binary value (e.g., "1"), with areas outside the line(s) marked with a second binary value (e.g., "0"). Canny edge detection is a multi-stage algorithm comprising the following stages.

A first stage is noise reduction. Since edge detection is susceptible to noise in the image, the first stage is noise reduction is to remove the noise in the image (e.g., with a 5×5 Gaussian filter). A second stage then includes finding an intensity gradient of the image.

The Smoothened image is then filtered with a Sobel kernel in both horizontal and vertical direction to get a first derivative in horizontal direction ($G_x$) and vertical direction ($G_y$). From these two images, examples may determine edge gradient and direction for each pixel as follows in Equation 1:

$$\text{Edge\_Gradient}(G) = \sqrt{G_z^2 + G_y^2}\ \text{Angle}(\theta) = \tan^{-1}\left(\frac{G_y}{G_z}\right) \qquad \text{Equation 1}$$

The gradient direction is always perpendicular to edges. The gradient direction is rounded to one of four angles representing vertical, horizontal and two diagonal directions.

A third stage may include non-maximum suppression. After getting gradient magnitude and direction, a full scan of the image is done to remove any unwanted pixels which may not constitute the edge. For this, at every pixel, pixel is checked if it is a local maximum in its neighborhood in the direction of gradient. In short, a binary image with "thin edges" is obtained.

The IR image may repeatedly be analyzed in the iterative process based on different temperature thresholds. That is, illustrated processing block 322 may execute to determine if all temperature thresholds were analyzed. If not, processing block 304 executes. Otherwise, illustrated processing block 324 combines the edges (isothermal lines) generated by the different thresholds and canny edge detection together into a single image, in which values outside the isothermal lines are marked with the second binary value while the isothermal lines are marked with the first binary value.

Illustrated processing 308 conducts linear regression on the edges to determine average gradients for the different edges. The edges (e.g., boundaries) that are identified above are linearly regressed to provide a set of linear functions corresponding to the following Equation 1:

$$y = kx + b \qquad \text{Equation 1}$$

Equation 1 may include therefore form lines. Illustrated processing block 312 determines the attitude (e.g., pitch, roll, etc.) from the gradients (e.g., slopes). For example, taking the average of slope k from all the lines determined from Equation 1, and using the trigonometry of the following Equation 2:

$$\varphi = \tan^{-1}(k) \qquad \text{Equation 2}$$

Equation 2 may find the roll or pitch by applying the inverse tangent to the average slope.

The output of Equation 2 may be a characteristic of the vehicle, and in particular an angle that is pitch or roll, depending on whether the image data is obtained from a forward-facing camera, similar to second imaging sensor 106 (FIG. 1A-1D), or side-facing camera, similar to first imaging sensor 104 (FIGS. 1A-1D). In some examples, processing block 304 executes after processing block 316 to operate on the masked binary image. For example, clouds may have a significant impact on the accuracy of method 300 as clouds have a uniform temperature similar to the sky. During processing block 306, the cloud form small contours. By using contour detection on the masked binary image and removing the clouds with short lengths from the masked binary image, a majority, if not all, of the clouds may be filtered out from the masked binary image.

Figure 3A:
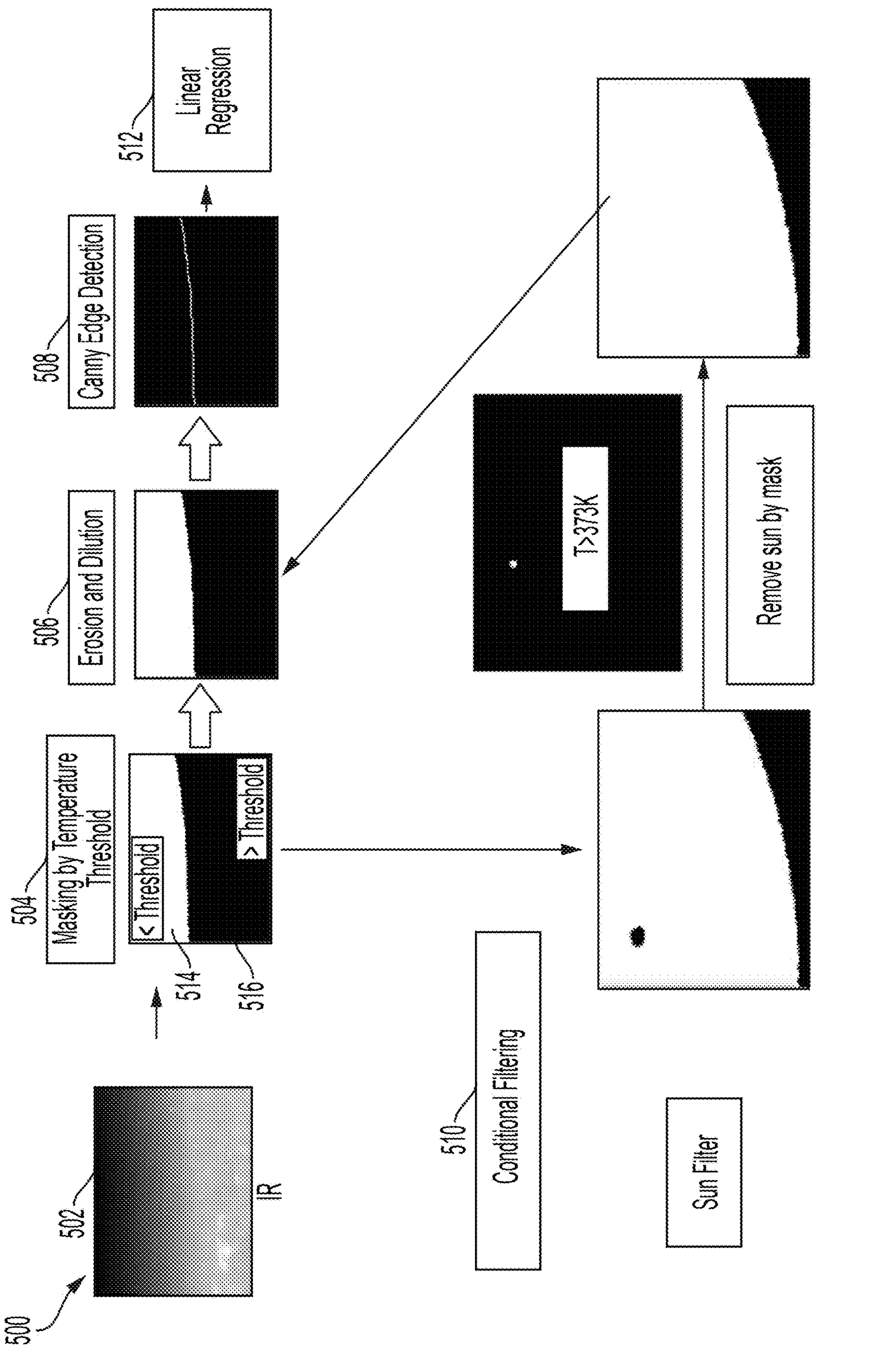
FIGS. 3A-3B illustrate a diagram of characteristic estimation process.
Figure 3B:
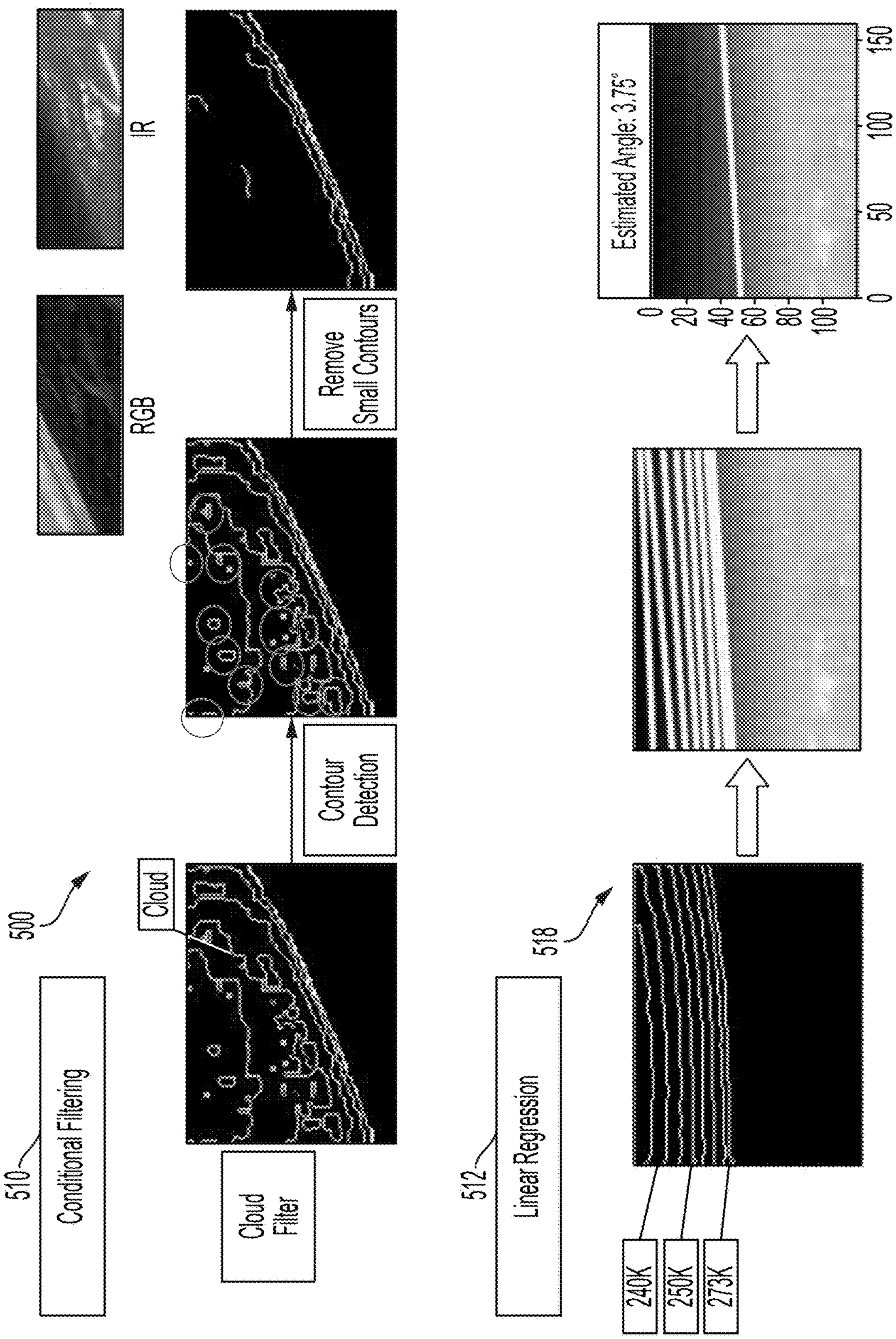

FIGS. 3A-3B illustrate a characteristic estimation process 500 that includes functions and images that illustrate the functions. The characteristic estimation process 500 may generally be implemented as part of the characteristic identification and machine adjustment process 100 (FIGS. 1A-1D) and/or method 300 (FIG. 2). An IR image 502 is provided. The characteristic estimation process 500 includes masking by temperature threshold 504. The upper portion 514 is below a temperature threshold, and the lower portion 516 is above the temperature threshold. Therefore, the upper portion is masked differently than the lower portion. The temperature threshold 504 may generate a binary image.

The characteristic estimation process 500 may further include executing a conditional filtering 510 as illustrated in FIGS. 3A, and further illustrated in FIG. 3B on the binary image. For example, the sun may be filtered and removed by a mask. In some examples and as noted in FIG. 3B, the conditional filtering 510 may further include filtering clouds by executing contour detection and to remove small contours. As noted above, clouds may the significant impact on the accuracy as clouds have a uniform temperature similar to the sky. The cloud form small contours. By using contour detection on the masked binary image and removing the clouds with short lengths from the masked binary image, a majority, if not all, of the clouds may be filtered out from the masked binary image to generate a filtered binary image.

Characteristic estimation process 500 includes an erosion and dilution function 506 to smooth out edges of the filtered binary image to generate an eroded and diluted binary image. Characteristic estimation process 500 includes a canny edge detection 508 on the eroded and diluted binary image output by the erosion and dilution function 506. The outcome is a binary image with only the edge (e.g., isothermal line) marked as 1.

Characteristic estimation process 500 includes linear regression 512 to identify the gradients and an angle of a vehicle. FIG. 3B illustrates the linear regression 512 in more detail. In detail, lines 518 are analyzed to detect the slopes of the lines 518. The slopes may be averaged to detect the estimated angle of 3.75.

Figure 4:
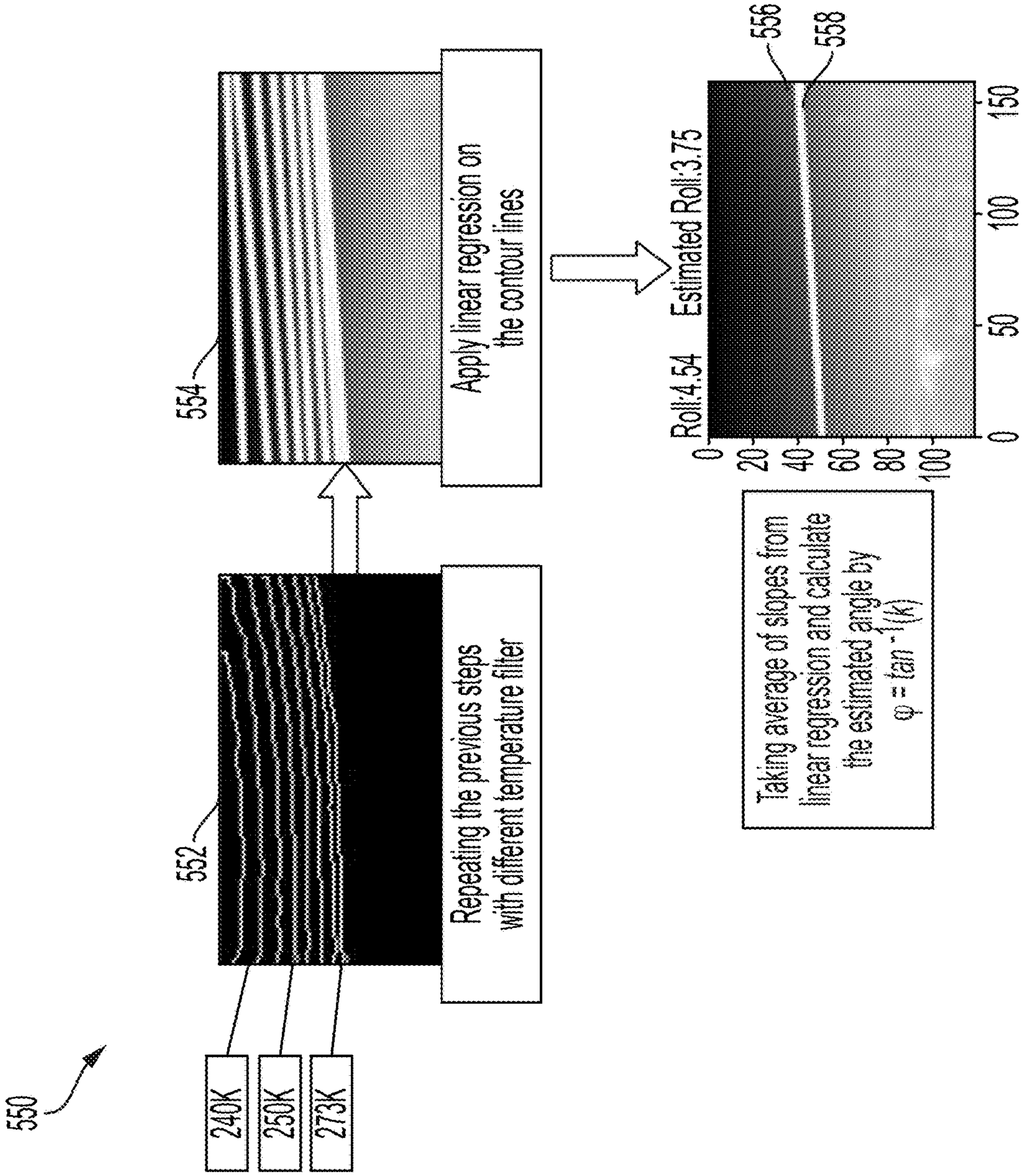
FIG. 4 illustrates a diagram of a linear regression.

FIG. 4 illustrates a linear regression 550 in more detail. The linear regression 550 may generally be implemented as part of the characteristic identification and machine adjustment process 100 (FIGS. 1A-1D), method 300 (FIG. 2) and/or characteristic estimation process 500 (FIGS. 3A-3B), particularly linear regression 512 (FIGS. 3A and 3B).

During the linear regression 550, previous features may be repeated (e.g., obtaining image data, masking by temperature, sun filtering, canny edge detection) with different temperature filters as noted above to generate a single image 552 including all identified isothermal lines. Linear regression 550 may execute application of linear regression on the isothermal lines in image 554. Linear regression 550 may take the average of slopes from linear regression and calculate estimated roll as illustrated in image 556. The estimated roll is graphically shown as the line 558 which has the estimated angle in the frame.

Figure 5:
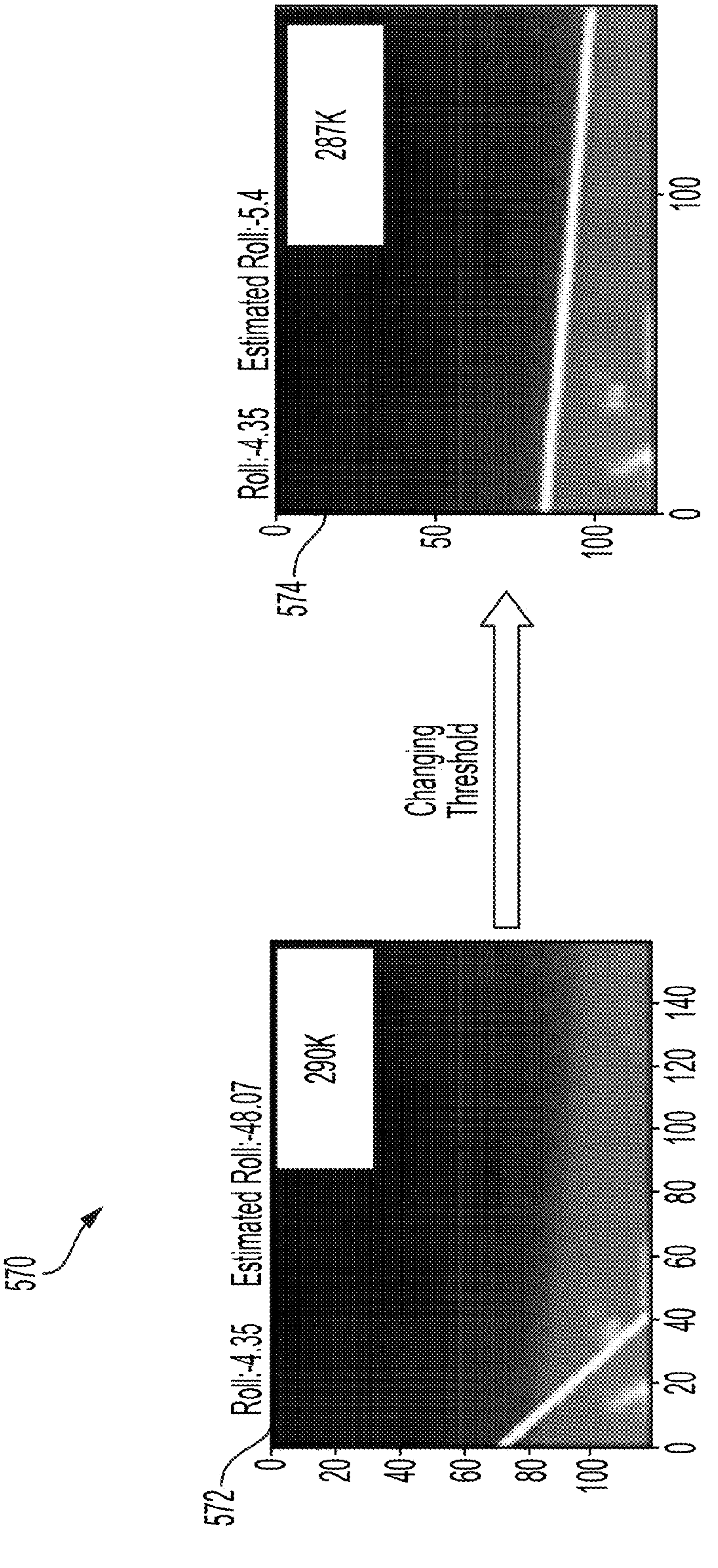
FIG. 5 illustrates a diagram of a temperature threshold process.

FIG. 5 illustrates a temperature threshold process 570 in more detail. The temperature threshold process 570 may generally be implemented as part of the characteristic identification and machine adjustment process 100 (FIGS. 1A-1D), method 300 (FIG. 2), characteristic estimation process 500 (FIGS. 3A-3B) and/or linear regression 550 (FIG. 4). The temperature threshold process 570 may change the threshold from 290 k in first image 572 to 287 k in second image 574. By varying the temperature threshold, examples successfully identify the roll angle with high accuracy.

Figure 6:
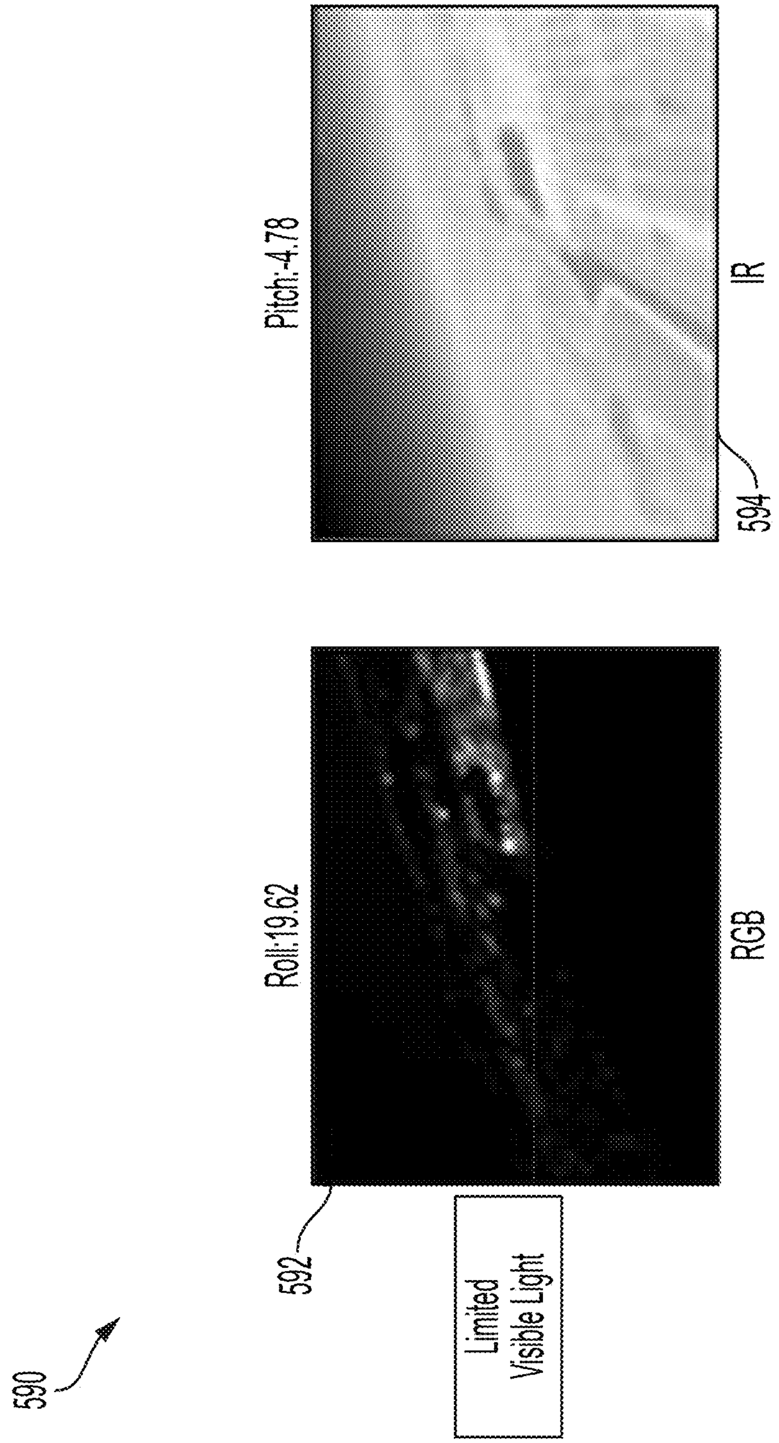
FIG. 6 illustrates a diagram of a comparison of a red-green-blue image and an infrared image during low luminance.

FIG. 6 illustrates a comparison 590 of an RGB image 592 and an IR image 594 of a same scene during a low luminance situation. The IR image 594 may be combined with any of the examples described herein. As illustrated, the IR image 594 is clearer than the RGB image 592.

Figure 7:
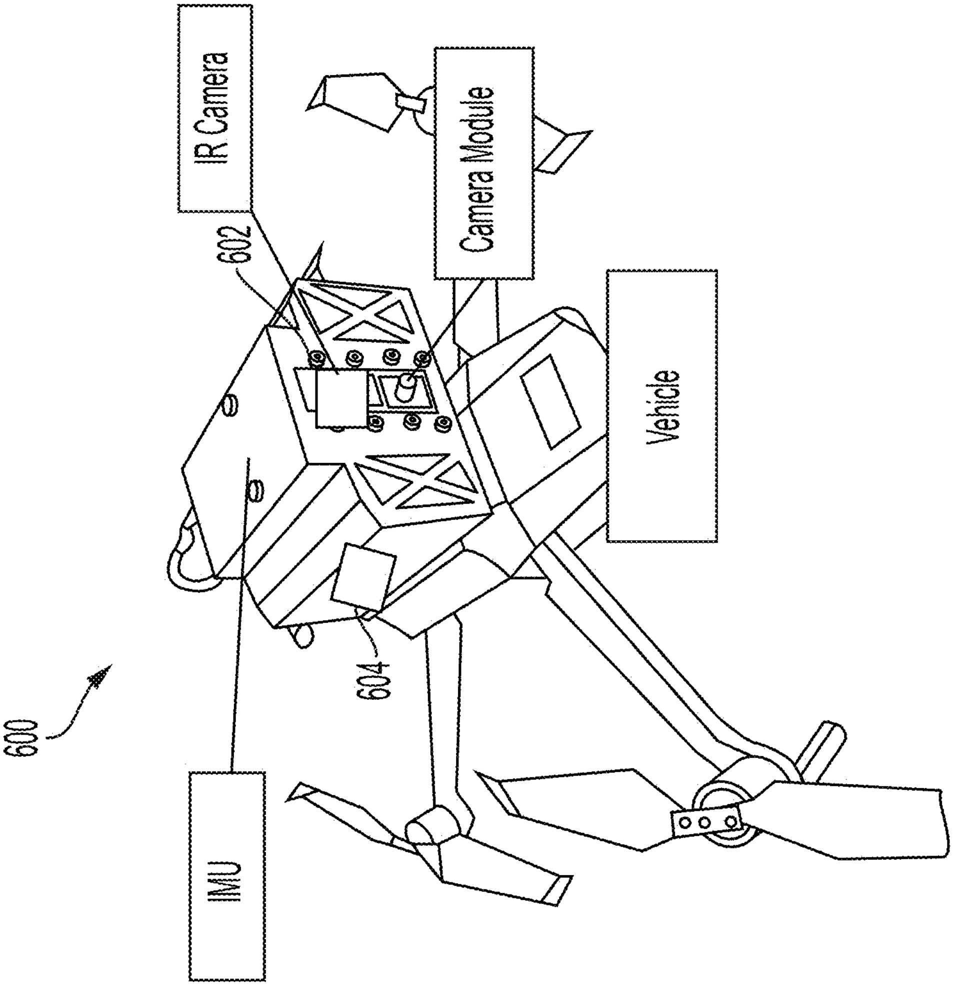
FIG. 7 illustrates a diagram of an autonomous drone.

FIG. 7 illustrates an autonomous drone 600. The autonomous drone 600 may include a forward-facing sensor 602, that may be an IR camera, and a side-facing sensor 604 (e.g., IR camera). The autonomous drone 600 may generally be implemented as part of the characteristic identification and machine adjustment process 100 (FIGS. 1A-1D), method 300 (FIG. 2), characteristic estimation process 500 (FIGS. 3A-3B), linear regression 550 (FIG. 4), temperature threshold process 570 (FIG. 5) and/or IR image 594 (FIG. 6).

Figure 8:
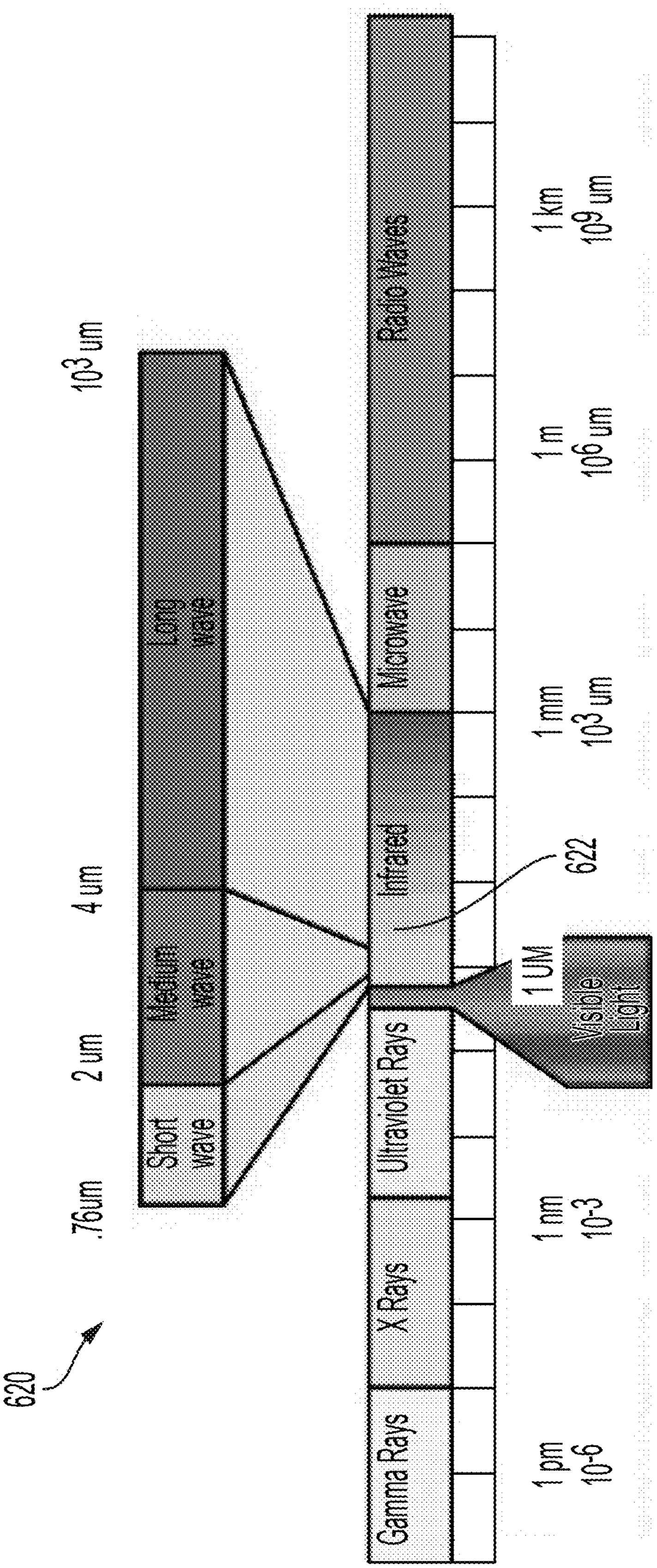
FIG. 8 illustrates different an electromagnetic spectrum.

FIG. 8 illustrates electromagnetic spectrum 620. The IR 622 may be measured in examples herein and used to determine characteristics of a vehicle. The IR 622 may be captured by imaging sensors and utilized herein, as described in the characteristic identification and machine adjustment process 100 (FIGS. 1A-1D), obtaining the pitch of method 300 (FIG. 2), characteristic estimation process 500 (FIGS. 3A-3B), linear regression 550 (FIG. 4), temperature threshold process 570 (FIG. 5), IR image 594 (FIG. 6) and/or autonomous drone 600 (FIG. 7). That is, analyzing the IR 622 provides several enhancements. For example, regardless of lighting condition, the sky naturally shows a temperature gradient which temperature gradually decreases as altitude increases. This is caused by a higher black body radiation from the earth surface. An IR camera may capture the longwave infrared waves from black body radiation at 8 μm to 14 μm. The module converts the wave intensity to a calibrated temperature value and later normalized to a monotone image (black and white). Some of the enhancements of an IR camera is that IR may penetrate layers of moisture such as mist, haze or fog, is visible in all lighting conditions and lacks an active light source.

Figure 9:
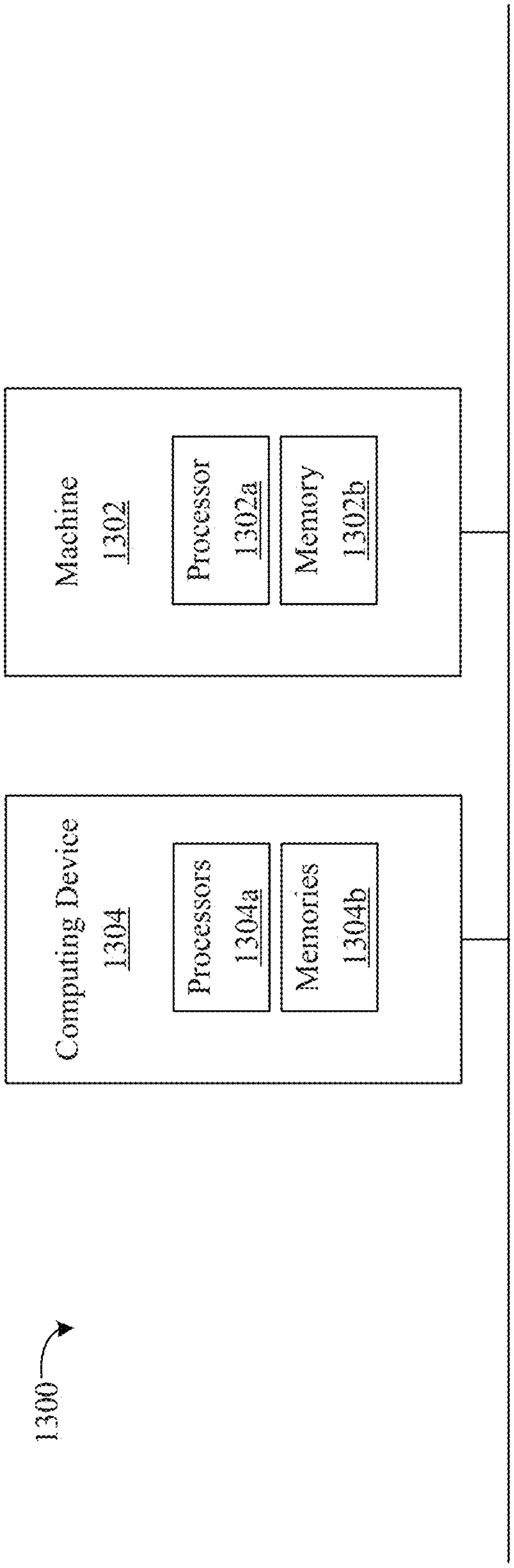
FIG. 9 shows a more detailed example of a diagram of a computing system.

FIG. 9 shows a more detailed example of a computing system 1300 to implement aspects as described herein. The computing system 1300 may generally be implemented as part of the characteristic identification and machine adjustment process 100 (FIGS. 1A-1D), method 300 (FIG. 2), characteristic estimation process 500 (FIGS. 3A-3B), linear regression 550 (FIG. 4), temperature threshold process 570 (FIG. 5), IR image 594 (FIG. 6) and/or autonomous drone 600 (FIG. 7).

In the illustrated example, a machine 1302 includes a processor **1302*a* (e.g., embedded controller, central processing unit/CPU) and a memory 1302*b* (e.g., non-volatile memory/NVM and/or volatile memory) containing a set of instructions, which when executed by the processor 1302*a*, cause the machine 1302 to implement any of the aspects described herein. For example, the machine 1302 may obtain an image from an IR sensor and provide the image to the computing device 1304, or process the image similarly to as described above. For example, the machine 1302 may obtain, from an imaging sensor, an image, determine isothermal lines on portions of the image that represents the sky, and determine a characteristic of a vehicle based on slopes of the isothermal lines. The machine 1302 may be the vehicle, and the machine 1302** may adjust the attitude by adjusting an operating parameter of a vehicle.

In the illustrated example, the computing device 1304 includes processors **1304*a* (e.g., embedded controller, central processing unit/CPU) and memories 1304*b* (e.g., non-volatile memory/NVM and/or volatile memory) containing a set of instructions, which when executed by the processor 1304*a*, cause the computing device 1304 to implement any of the aspects described herein. For example, the computing device 1304 may, instead of the machine 1302**, determine isothermal lines on the image, and determine a characteristic of a vehicle based on the isothermal lines.

Figure 10:
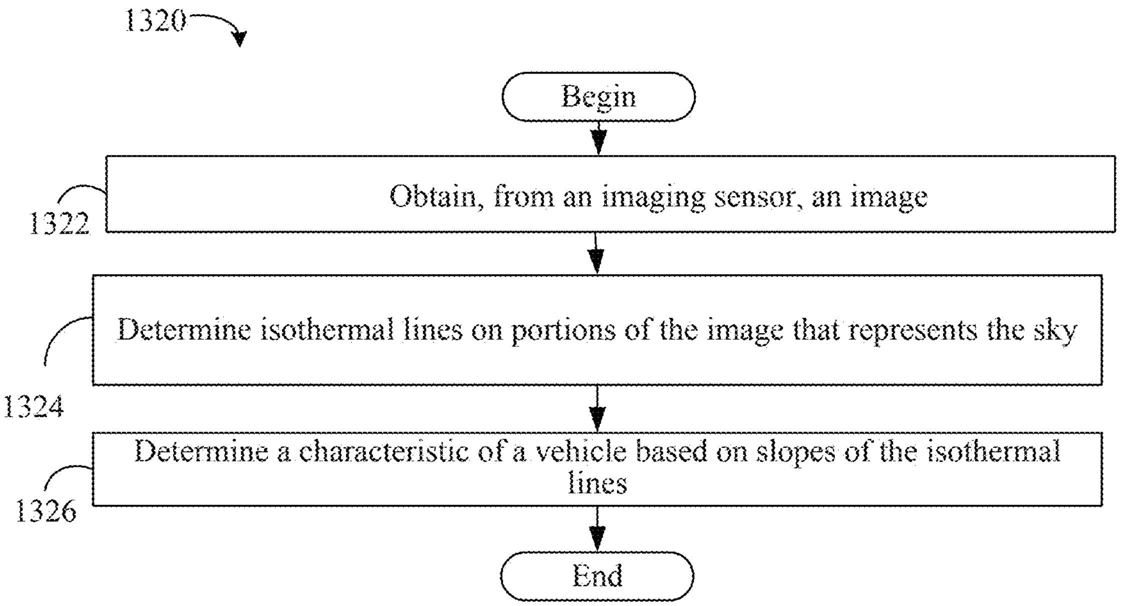
FIG. 10 shows a method of identifying characteristics of a machine.

FIG. 10 shows a method 1320 of identifying characteristics of a machine. The method 1320 may generally be implemented as part of the characteristic identification and machine adjustment process 100 (FIGS. 1A-1D), method 300 (FIG. 2), characteristic estimation process 500 (FIGS. 3A-3B), linear regression 550 (FIG. 4), temperature threshold process 570 (FIG. 5), IR image 594 (FIG. 6), temperature threshold process 570 (FIG. 7), autonomous drone 600 (FIG. 9) and/or computing system 1300 (FIG. 10). In an embodiment, the method 1320 is implemented in logic instructions (e.g., software), a non-transitory computer readable storage medium, circuitry, configurable logic, fixed-functionality hardware logic, etc., or any combination thereof.

Illustrated processing block 1322 obtains, from an imaging sensor, an image. Illustrated processing block 1324 determines isothermal lines on portions of the image that represents the sky. Illustrated processing block 1326 determine a characteristic of a vehicle based on slopes of the isothermal lines.

In some examples, the image includes first and second images, and the imaging sensor includes a first imaging sensor that obtains the first image, and a second imaging sensor that obtains the second image. In such examples, the isothermal line includes isothermal lines, and to determine the characteristic, the method 1320 determines a pitch angle based on a first set of the isothermal lines on the first image. To determine the characteristic, in some examples the method 1320 determines a roll angle based on a second set of the isothermal lines on the second image. In some examples, the first imaging sensor has a side-facing posture and is mounted to a pitch axis of the vehicle, and the second imaging sensor has a forward-facing posture and is mounted to a roll axis of the vehicle.

In some examples, the method 1320 includes adjusting an operating parameter of the vehicle based on the characteristic. In some examples, the isothermal lines correspond to different temperatures, the imaging sensor is an infrared sensor, and the vehicle is an aircraft.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A control system comprising:

a processor; and a memory having a set of instructions, which when executed by the processor, cause the control system to:

obtain, from an imaging sensor, an image;

determine isothermal lines on portions of the image that represent the sky; and determine a characteristic of a vehicle based on slopes of the isothermal lines, wherein the image includes first and second images, and the imaging sensor includes a first imaging sensor that obtains the first image, and a second imaging sensor that obtains the second image, wherein the second imaging sensor is perpendicularly-oriented relative to the first imaging sensor to obtain images that are oriented perpendicular to each other.

2. The control system of claim 1, wherein to determine the characteristic, the instructions of the memory, when executed, cause the control system to:

determine a pitch angle based on a first set of the isothermal lines on the first image.

3. The control system of claim 2, wherein to determine the characteristic, the instructions of the memory, when executed, cause the control system to:

determine a roll angle based on a second set of the isothermal lines on the second image.

4. The control system of claim 3, wherein:

the first imaging sensor has a side-facing posture and is mounted to a pitch axis of the vehicle; and the second imaging sensor has a forward-facing posture and is mounted to a roll axis of the vehicle.

5. The control system of claim 1, wherein the instructions of the memory, when executed, cause the control system to:

adjust an operating parameter of the vehicle based on the characteristic.

6. The control system of claim 1, wherein:

the isothermal lines correspond to different temperatures, the imaging sensor is an infrared sensor, and the vehicle is an aircraft.

7. At least one computer readable storage medium comprising a set of instructions, which when executed by a computing device, cause the computing device to:

obtain, from an imaging sensor, an image;

determine isothermal lines on portions of the image that represent the sky; and determine a characteristic of a vehicle based on slopes of the isothermal lines, wherein the image includes first and second images, and the imaging sensor includes a first imaging sensor that obtains the first image, and a second imaging sensor that obtains the second image, wherein the second imaging sensor is perpendicularly-oriented relative to the first imaging sensor to obtain images that are oriented perpendicular to each other.

8. The at least one computer readable storage medium of claim 7, wherein to determine the characteristic the instructions, when executed, cause the computing device to:

determine a pitch angle based on a first set of the isothermal lines on the first image.

9. The at least one computer readable storage medium of claim 8, wherein to determine the characteristic the instructions, when executed, cause the computing device to:

determine a roll angle based on a second set of the isothermal lines on the second image.

10. The at least one computer readable storage medium of claim 9, wherein:

the first imaging sensor has a side-facing posture and is mounted to a pitch axis of the vehicle; and the second imaging sensor has a forward-facing posture and is mounted to a roll axis of the vehicle.

11. The at least one computer readable storage medium of claim 7, wherein the instructions, when executed, cause the computing device to:

adjust an operating parameter of the vehicle based on the characteristic.

12. The at least one computer readable storage medium of claim 7, wherein:

the isothermal lines correspond to different temperatures, the imaging sensor is an infrared sensor, and the vehicle is an aircraft.

13. A machine comprising:

an imaging sensor that obtains an image;

a processor; and a memory having a set of instructions, which when executed by the processor, cause the machine to:

determine isothermal lines on portions of the image that represent the sky; and determine a characteristic of a vehicle based on slopes of the isothermal lines, wherein the image includes first and second images, and the imaging sensor includes a first imaging sensor that obtains the first image, and a second imaging sensor that obtains the second image, wherein the second imaging sensor is perpendicularly-oriented relative to the first imaging sensor to obtain images that are oriented perpendicular to each other.

14. The machine of claim 13, wherein to determine the characteristic the instructions, which when executed by the processor, cause the machine to:

determine a pitch angle based on a first set of the isothermal lines on the first image.

15. The machine of claim 14, wherein to determine the characteristic the instructions, which when executed by the processor, cause the machine to:

determine a roll angle based on a second set of the isothermal lines on the second image.

16. The machine of claim 15, wherein:

the first imaging sensor has a side-facing posture and is mounted to a pitch axis of the vehicle;

the second imaging sensor has a forward-facing posture and is mounted to a roll axis of the vehicle;

the isothermal lines correspond to different temperatures;

the imaging sensor is an infrared sensor; and the vehicle is an aircraft.

17. The machine of claim 13, wherein the instructions, which when executed by the processor, cause the machine to:

adjust an operating parameter of the vehicle based on the characteristic.

* * * * *